2,713,063
METHOD OF PREPARING FLUOROSILANES

Leo H. Sommer, State College, Pa., assignor to Dow Corning Corporation, Midland, Mich., a corporation of Michigan No Drawing. Application November 30, 1953, Serial No. 395,315

1 Claim. (Cl. 260—448.2)

This invention relates to a method of preparing fluorosilanes without the use of hydrogen fluoride.

Prior to this invention it was known that fluorosilanes could be prepared by reacting organoalkoxysilanes and organosiloxanes with aqueous and anhydrous hydrogen fluoride. These methods suffer from the disadvantage that they require the use of a corrosive and toxic material which is difficult to handle.

It is the object of the present invention to provide a novel, economical method for the preparation of fluorosilanes which does not involve the use of a corrosive material.

In accordance with this invention fluorosilanes are prepared by reacting an organosilicon compound of the group organosiloxanes of the formula

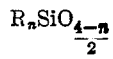

organohydrocarbonoxysilanes of the formula

and organosilanols of the formula $R_xSi(OH)_{4-x}$ with the etherate of borontrifluoride and diethylether. In the organosilicon compounds R is a radical of the group saturated aliphatic hydrocarbon radicals, halogenated saturated aliphatic hydrocarbon radicals, aryl hydrocarbon radicals and halogenated aryl hydrocarbon radicals, $n$ has a value from 1 to 3, $R'$ is a monovalent hydrocarbon radical, $m$ has a value from 0 to 3 and $x$ has a value from 1 to 2.

This invention includes within its scope the use of organosiloxanes of the types $RSiO_{1.5}$, $R_2SiO$ and $R_3SiO_{.5}$, where R is any of the above defined radicals. Specific examples of siloxanes which can be employed herein are alkyl substituted siloxanes such as methyl siloxanes, propyl siloxanes, butyl siloxanes and octadecyl siloxanes; cycloaliphatic siloxanes such as cyclohexyl siloxanes and cyclophentyl siloxanes; halogenated saturated aliphatic hydrocarbon substituted siloxanes such as chloromethyl siloxanes, chlorocyclohexyl siloxanes, tetrafluoroethyl siloxanes, trifluorochloroethyl siloxanes and bromomethyl siloxanes; aryl hydrocarbon substituted siloxanes such as phenyl siloxanes, tolyl siloxanes, xenyl siloxanes and naphthyl siloxanes and halogenated aryl substituted siloxanes such as chlorophenyl siloxanes, bromophenyl siloxanes, $\alpha,\alpha,\alpha$-trifluorotolyl siloxanes and dichloroxenyl siloxanes. It should be understood that for the purpose of this invention the various R groups on the silicon atom can be the same or different radicals. It should also be understood that the siloxanes can be either copolymers or homopolymers and that the term siloxane as employed herein includes completely condensed siloxanes and incompletely condensed siloxanes (i. e., those which contain silicon bonded hydroxyl groups).

This invention includes within its scope hydrocarbonoxy silanes of the following types: $Si(OR')_4$, $RSi(OR')_3$, $R_2Si(OR')_2$, and $R_3SiOR'$. In these silanes R is the same as defined for the siloxanes and R' is any monovalent hydrocarbon radical. Specific examples of silanes which are operative herein are tetraalkoxy silanes such as ethylorthosilicate and methylorthosilicate; tetraaryloxy silanes such as tetraphenoxy silane and tetracresoxysilane; trihydrocarbonoxy silanes such as methyltriethoxysilane, phenyltributoxysilane, octadecyltriphenoxysilane and chlorophenyltriisopropoxysilane; dihydrocarbonoxysilanes such as dimethyldiethoxysilane, phenylmethyldibutoxysilane and dipropyldistearyloxysilane and monohydrocarbonoxysilanes such as triphenylphenoxysilane and tricyclohexylisopropoxysilane.

The silanols which are within the scope of this invention are of the type $R_2Si(OH)_2$ and $R_3SiOH$ where R is as above defined. Specific examples of operative silanols are diols such as phenylmethylsilanediol, diphenylsilanediol, bis-chlorophenylsilanediol, bis-dichlorophenylsilanediol, bis-$\alpha,\alpha,\alpha$-trifluorotolylsilanediol, and diethylsilanediol and silanemonools such as trimethylsilanol, triethylsilanol, triphenylsilanol and phenyldimethylsilanol.

Reaction takes place spontaneously upon mixing the organosilicon compound and the borontrifluoride etherate. The reaction may be represented schematically as follows: $\equiv SiO-+-=BF \rightarrow \equiv SiF+=BO-$. The products are fluorosilanes and boric oxide, boric acid esters, or boric acid depending upon whether or not the organosilicon reactant is a siloxane, a hydrocarbonoxysilane or a silanol, respectively. Whereas the reaction will take place at room temperature, it is often preferable to heat the reaction mixture in order to hasten the reaction. In general, the reaction is carried out up to 126° C. which is the boiling point of the etherate.

The etherate employed in this invention has the formula $BF_3 \cdot Et_2O$. It is a commercial product which is prepared by adding borontrifluoride to diethylether.

The fluorosilanes prepared by the method of this invention are useful as water repellent agents.

The following examples are illustrative only and should not be construed as limiting the invention which is properly delineated in the appended claims.

Example 1

.6 mol of hexamethyldisiloxane and .2 mol of $BF_3 \cdot Et_2O$ were mixed and heated at a temperature from 50–60° C. Reaction began at once as shown by the formation of an homogeneous solution and the distillation of trimethylfluorosilane which was obtained in 94% yield.

Example 2

.4 mol of phenylmethyldiethoxysilane and .27 mol of $BF_3 \cdot Et_2O$ were mixed and refluxed for 3 hours. Upon distillation phenylmethyldifluorosilane was obtained.

Example 3

.3 mol of octamethylcyclotetrasiloxane was mixed with .2 mol of the etherate of borontrifluoride and diethylether and the mixture was heated to 90° C. Distillation of the product was then carried out to give dimethyldifluorosilane and sym-difluorotetramethyldisiloxane. The latter compound had a B. P. of 75 to 76° C. at 732 mm. and was found upon titration to contain 22.1 and 22.4% fluorine.

Example 4

The following siloxanes were reacted with $BF_3 \cdot Et_2O$ in accordance with the procedure of Example 1. In each case the yield of the corresponding monofluorosilane was from 90–95% of theoretical.

| Siloxane | Fluorosilane Produced |
|---|---|
| Chloromethylpentamethyldisiloxane | Chloromethyldimethylfluorosilane and trimethylfluorosilane |
| Bis-chloromethyltetramethyldisiloxane | Chloromethyldimethylfluorosilane |
| Sym-diethyltetramethyldisiloxane | Ethyldimethylfluorosilane |
| Hexaethyldisiloxane | Triethylfluorosilane |

*Example 5*

Trimethylethoxysilane was reacted with $BF_3 \cdot Et_2O$ in accordance with the method of Example 2. Triethyltrifluorosilane was obtained.

*Example 6*

Ethylorthosilicate was reacted with $BF_3 \cdot Et_2O$ in accordance with the procedure of Example 2. Silicontetrafluoride was obtained.

*Example 7*

.6 mol of triethylsilanol was mixed with .2 mol of $BF_3 \cdot Et_2O$. Reaction proceeded smoothly to give a 90% yield of triethylfluorosilane which was obtained by distilling the reaction mixture.

*Example 8*

When chlorophenylsiloxane is reacted with $BF_3 \cdot Et_2O$ in benzene solution in amount such that there is 3 fluorine atoms per silicon atom and the product is distilled, chlorophenyltrifluorosilane is obtained.

*Example 9*

When octadecylmethylsiloxane is reacted with $BF_3 \cdot Et_2O$ in amount such that there are 2 fluorine atoms per silicon atom and the product is distilled, octadecylmethyldifluorosilane is obtained.

That which is claimed is:

The method of preparing fluorosilanes which comprises reacting an organosilicon compound selected from the group consisting of siloxanes of the formula

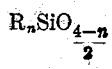

silanes of the formula $R_mSi(OR')_{4-m}$ and silanols of the formula $R_xSi(OH)_{4-x}$ in which R is selected from the group consisting of saturated aliphatic hydrocarbon, halogenated saturated aliphatic hydrocarbon, aryl hydrocarbon and halogenated aryl hydrocarbon radicals, R' is a monovalent hydrocarbon radical, $n$ has a value from 1 to 3, $m$ has a value from 0 to 3 and $x$ has a value from 1 to 2, with the etherate of boron trifluoride and diethyl-ether.

References Cited in the file of this patent
UNITED STATES PATENTS 2,381,366    Patnode _____ Aug. 7, 1945